United States Patent [19]
Capps, Jr. et al.

[11] Patent Number: 5,430,860
[45] Date of Patent: Jul. 4, 1995

[54] MECHANISM FOR EFFICIENTLY RELEASING MEMORY LOCK, AFTER ALLOWING COMPLETION OF CURRENT ATOMIC SEQUENCE

[75] Inventors: Louis B. Capps, Jr., Boynton Beach; Philip E. Milling, Delray Beach; Warren E. Price, Boca Raton, all of Fla.

[73] Assignee: International Business Machines Inc., Armonk, N.Y.

[21] Appl. No.: 761,095

[22] Filed: Sep. 17, 1991

[51] Int. Cl.[6] .................. G06F 13/00; G06F 13/14
[52] U.S. Cl. .................... 395/425; 395/325; 395/725; 364/DIG. 1
[58] Field of Search .................. 395/425, 325, 725; 364/DIG. 1

[56] References Cited

U.S. PATENT DOCUMENTS

| | | | |
|---|---|---|---|
| 4,237,534 | 12/1980 | Felix | 395/325 |
| 4,402,046 | 8/1983 | Cox et al. | 395/200 |
| 4,480,304 | 10/1984 | Carr et al. | 395/725 |
| 4,561,051 | 12/1985 | Rodman et al. | 395/425 |
| 4,604,694 | 8/1986 | Hough | 395/650 |
| 4,665,484 | 5/1987 | Nanba | 395/650 |
| 4,809,168 | 2/1989 | Hennessey et al. | 395/650 |
| 4,847,754 | 7/1989 | Obermarck et al. | 395/650 |
| 4,858,116 | 8/1989 | Gillett, Jr. et al. | 395/325 |
| 4,941,083 | 7/1990 | Gillett, Jr. et al. | 395/325 |
| 4,949,239 | 8/1990 | Gillett, Jr. et al. | 395/325 |
| 4,958,273 | 9/1990 | Anderson et al. | 395/800 |
| 4,975,833 | 12/1990 | Jinzaki | 395/425 |
| 4,975,870 | 12/1990 | Knicely et al. | 395/425 |
| 5,129,090 | 7/1992 | Bland et al. | 395/725 |
| 5,163,143 | 11/1992 | Culley et al. | 395/425 |
| 5,167,022 | 11/1992 | Bahr et al. | 395/325 |
| 5,170,481 | 12/1992 | Begun et al. | 395/725 |
| 5,175,829 | 12/1992 | Stumpf et al. | 395/375 |
| 5,182,809 | 1/1993 | Begun et al. | 395/725 |
| 5,193,167 | 3/1993 | Sites et al. | 395/425 |

*Primary Examiner*—Glenn Gossage
*Attorney, Agent, or Firm*—Michael J. Buchenhorner

[57] ABSTRACT

A logic circuit mechanism for inducing a processing unit to release a LOCK signal that the processing unit uses to secure continuous access to a memory system during read modify write operations requiring "atomic" (continuous) access. The processing unit has an internal cache enabling it to set up consecutive memory access operations at a pace such that the LOCK signal could be held continuously active while a string of atomic memory accesses is carried out. The present circuit mechanism prevents premature release of the processing unit's LOCK signal, by asserting a Hold signal which requires the processing unit to release its LOCK signal but only after that unit has fully completed its current atomic access operation. The logic circuit reduces its impact on processing unit performance by detecting when the LOCK signal has been active continuously for N consecutive atomic operations coinciding with external contention, and calling for release of the CPUs LOCK signal only while the Nth such operation is being conducted.

8 Claims, 2 Drawing Sheets

MECHANISM FOR EFFICIENTLY RELEASING MEMORY LOCK, AFTER ALLOWING COMPLETION OF CURRENT ATOMIC SEQUENCE

FIELD OF THE INVENTION

This invention relates to a mechanism for inducing a central processing unit (CPU) to release a lock signal which exerts exclusive control over access to a memory subsystem that is accessible to both the processing unit and other devices and processing elements. More specifically, the invention relates to a logical mechanism for inducing the CPU to release its lock signal without potentially compromising integrity of data in the storage subsystem; i.e. data which the processing unit is accessing at the time it releases the lock signal.

BACKGROUND OF THE INVENTION

In contemporary data processing systems, it is conventional for a (CPU) to exert exclusive control over a memory subsystem which is concurrently accessible to the CPU and other system elements (peripheral devices, other processing subsystems, etc.). For instance, present day 80386 and 80486 processing units made by Intel Corporation (Santa Clara, Calif.) have a lock signal output pin useful for that purpose.

Generally, the lock signal is used by the CPU to secure continuous ("atomic") memory access while the CPU is performing a Read Modify Write operation, relative to data in the memory subsystem, so that integrity of such data can not be compromised as a result of actions performed concurrently by the CPU and other system elements. In such cases, a semaphore signal (memory operand) is used to control access to some resource such as memory, a program or a device. Before the CPU or other system element can gain control of the associated resource, it must first attempt to read the semaphore, ascertain that it is marked available, and then mark it "in use" (i.e. modify the semaphore and write the modified semaphore to memory). If the semaphore is marked "in use" when read, the CPU or other element can not access the respective resource.

In order for this process to work correctly, the semaphore can only be susceptible of modification by one system entity at any time (e.g. the CPU or another system element). Otherwise, the state of the semaphore could be misread or miswritten, resulting in two entities (or none) getting access to the associated resource, with unpredictable and usually erroneous results.

It is also conventional in such systems to have the memory subsystem control access to a system bus which links it with the other system elements mentioned above, and to carry out that function transparent to the CPU when the CPU lock signal is inactive. This type of arrangement can improve CPU performance, but it also prevents the CPU from being able to detect external contention for memory access when such detection would be useful.

For instance, certain CPU configurations (particularly, CPUs with internal cache), may be capable of extending their lock control over memory access continuously while carrying out multiple atomic access operations consecutively. This could cause erroneous operation of the external elements or the memory subsystem if external access is blocked for too long a time (e.g. it could block timely refresh of memory cells requiring such) or cause overrun conditions relative to external devices or elements).

This potential problem has recognized earlier, and avoided by means of a prior art "back off" (BOff) circuit mechanism. That circuit presents a backoff signal to the CPU when external contention for memory access coincides with a CPU "Locked Write" operation relative to memory (i.e. the Write portion of an atomic Read Modify Write operation). The backoff signal forces the CPU unconditionally to release its lock signal within a predetermined time (one CPU clock period) after activation of the backoff signal, and the backoff signal is tit led to bring about this release at the end of the current locked write operation. Thus, the current atomic operation is completed if its end coincides with the end of the current locked write.

A problem presently recognized, however, is that an atomic operation which would require a single read and a single write to process aligned (semaphore) data (e.g. data words located on word boundaries of a memory system accessed a word at a time), would require more read and write operations to process unaligned data (e.g. data words distributed over two word storage positions in the same memory system); i.e. two read operations to read a word from two word storage locations, and two write operations to write a modified word to the same two locations.

Thus, if the backoff signal is activated during other than the last write of an atomic operation relative to unaligned data, the lock signal would be released before the end of that operation, and the (semaphore) data written would be incomplete or erroneous. If that occurred, the integrity of the associated data or resource could be compromised (e.g. by external access to the affected semaphore data before the CPU has a chance to complete the operation).

Although the statistical probability of this chain of circumstances occurring—the CPU being caused to prematurely end an atomic operation relative to an unaligned operand which is then externally accessed before the CPU can complete its operation (i.e. within a short interval on the order of tens of microseconds)—is very small, the possibility that it could occur is considered sufficiently troublesome to require that it be avoided completely. The present invention accomplishes that purpose. It also provides certain operational advantages over the BOff (prior art) lock release circuit mechanism that tend to improve overall CPU performance without significantly degradating external access to memory.

OBJECTS OF THE INVENTION

An object of this invention is to provide a logic circuit mechanism for inducing a CPU to release a memory lock signal, that excludes other devices and systems from access to a memory subsystem that is controlled by that signal, in a manner such that any atomic memory access operation being conducted by the CPU under control of the lock signal will not be prematurely terminated when it is signalled to release the lock signal.

Another object of the invention is to provide a circuit for inducing a CPU to release a lock signal blocking external access to a memory system, without the possibility of the release occurring prematurely and only when there is external contention for access to the memory system.

Another object is to provide a circuit for inducing a CPU to release a lock signal blocking external access to a memory system, without the possibility of the release occurring prematurely and only when the CPU is conducting atomic access sequence relative to the memory system that has been concatenated to a previous atomic access sequence by continuous assertion of the lock signal; thereby reducing the number of times the CPU is delayed by having to respond to signals presented by this circuit calling for release of lock signals.

SUMMARY OF THE INVENTION

In accordance with the subject invention, a logic circuit interposed between a CPU and a memory subsystem conditionally presents a CPUHOLD signal to the CPU that has the effect of inducing the latter to release its lock signal only after completing its current atomic access sequence relative to the memory system. Thus, integrity of unaligned modified semaphore data that must be written by the CPU during that sequence is not potentially compromised by premature release of the lock signal.

In order to minimize impact on CPU performance, the CPUHOLD signal is asserted only when the circuit of present invention detects an existence of an external contention for access to the memory subsystem. This circuit detects the external contention by monitoring a HOLD signal representing such contention. Thus, the CPU is not required to relinquish control of access to memory unnecessarily.

In order to further minimize effects on CPU performance, CPUHOLD is asserted only when the circuit of this invention detects that the CPU is engaged in a second sequence of atomic access to memory, after having completed a first sequence of such access without having released its lock signal. Thus, the CPU is not delayed by having to detect and respond to CPUHOLD when it is performing a single atomic access sequence that it would conclude automatically with the release of the CPU lock signal.

In accordance with the feature described in the preceding paragraph, the circuit of this invention detects that the CPU is engaged in a second atomic sequence, that has been concatenated continuously to a first sequence (by continuous assertion of the CPU lock signal), by detecting that, while the CPU lock signal is continuously asserted, the CPU is performing a read operation after having completed a write operation preceded by another read operation.

These and other features, objects, advantages and benefits of the invention will be more fully understood and appreciated from the following detailed description and claims.

DETAILED DESCRIPTION OF THE INVENTION

1. System Configuration, Lock Problem and Prior Solution

Figure 1:
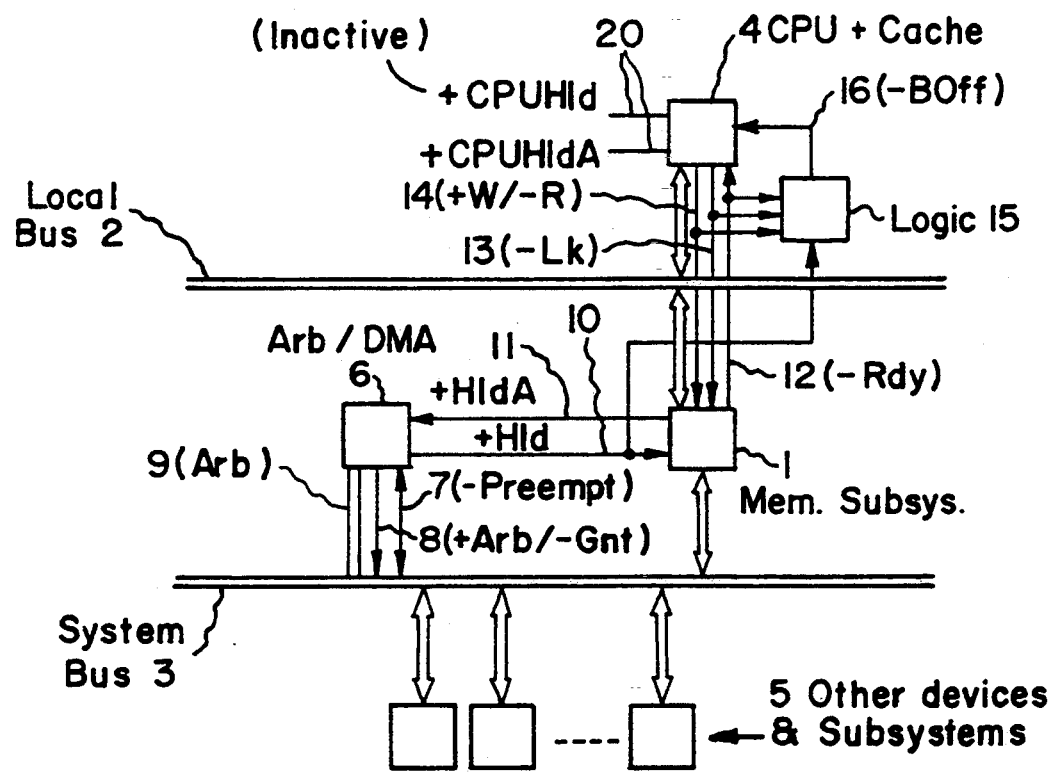
FIG. 1 is a block diagram of a prior art system containing a memory subsystem, a CPU and other elements having access to the memory subsystem, and a prior art BOFF circuit that is useful for forcing the CPU to release a LOCK signal by which the latter controls atomic access to the memory subsystem.

FIG. 1 illustrates a previously known system configuration, and a prior art circuit arrangement for inducing release of a CPU LOCK signal in that configuration. Here, memory subsystem 1 has separate connections to a local bus 2 and a system bus 3. Memory subsystem 1 is "pseudo dual ported", meaning that it has two physically separate ports but can be accessed through only one of the ports at a time. The local bus connects to CPU (+Cache) 4, and the system bus connects to other devices and subsystems (or processing elements) 5. CPU 4 in this configuration contains an internal cache which enables it to operate in a manner capable of giving rise to an "extended lock" signal capable of interfering with external access to memory; and thereby preventing proper refresh of memory or causing overrun conditions in external devices or elements that require access to memory.

A typical CPU with internal cache, that is susceptible of operating to extend its lock signal in this manner, is the 80486 microprocessor made by Intel Corporation, Santa Clara, Calif. Normally, a CPU without internal cache would have to deassert the lock signal by which it controls access to memory after each sequence of atomic access to memory is completed. However, with an internal cache, the CPU may be operated by a program stored in its cache to initiate another atomic access just as it completes a prior atomic access, in a manner such that the CPU is unable to release and reactivate its lock signal between the two accesses.

Naturally, if such "continuous concatenation" of atomic accesses by the CPU does not interfere with proper operations of the memory system and external elements, it would be beneficial in respect to enhancing CPU performance. However, when such concatenation actions potentially conflict with other system operations, it becomes necessary to externally force the CPU to release its lock signal. The release must be externally induced because the CPU itself is unaware of the state of external contention for access to memory and bus 3 in the illustrated configuration.

Each bus, 2 and 3, contains separate lines for conducting data, address and control signals. Certain control signals specifically relevant to the present discussion are indicated separately in this figure.

Although the problem to be described with respect to this configuration is applicable potentially to many different system bus arrangements, that problem is described here with respect to a system bus that conforms to the now well known Micro Channel architecture. (Microchannel is a trademark of the International Business Machines (IBM) Corporation). Access to the type of bus is controlled by an arbitration (Arb) controller 6. In the illustrated configuration, controller 6 is physically and logically associated with a direct memory access (DMA) controller, and is therefore labelled Arb/DMA (representing "Arb and DMA controls").

As is conventional in such systems, "external" elements 5 requiring access to bus 3 activate a "—Preempt" signal on common control line 7. Arb controller 6 responds conditionally to the Preempt signal by returning a +Arb signal, via "+Arb/—Grant" control line 8, that indicates arbitration should begin. In response to the latter signal, elements 5 then requiring bus access conduct an arbitration procedure in which they self determine which element is to control the bus next. In this procedure, the elements present digital signal combinations on the four Arb lines 9. These digital signals correspond to priority levels preassigned to the elements. Each element has a unique assigned level.

The elements signalling on lines 9 monitor the same lines and adjust their signals so that the level eventually manifested on these lines represents the priority of the arbitrating element having highest instantaneous priority for access to bus 3. When bus 3 is available for access, arb controller 6 lowers the signal on line 8 to —Grant in order to indicate a "bus grant" condition. The element having the highest priority at that time wins the arbitration (assumes control of the bus and begins its exchange with memory subsystem 1, or with another element 5). Arb controller 6 determines availability of bus 3 for access by presenting a Hold signal (+Hld) to (controls of) memory subsystem 1, via control line 10, and receiving a +HoldAcknowledge signal (+HldA) via control 1Mine 11 when the memory subsystem and bus 3 are ready for access.

In general, the HldA signal is returned instantly (or almost instantly) when memory and bus 3 are ready and CPU 4 is not accessing memory in a locked mode. When the CPU completes a memory access, and Hld is active, HldA is asserted, making the memory subsystem and bus 3 available to the external element winning arbitration (during arbitration, memory and bus 3 are susceptible to control by the CPU). When the CPU completes a memory access and Hld is inactive, ready signal —Rdy is asserted relative to the CPU on control line 12. If the CPU requires memory access, it presents an access request signal via other control lines (not shown) and connection to the memory subsystem is established for that access. If such access is required to be in atomic/locked mode, the CPU activates its lock control signal —Lk on control line 13, presents address signals to the memory system (on address lines (not shown) of bus 2) and at the same time uses signal levels on line 14 to indicate directions of required data transfers (+for Writes, —for Reads).

The foregoing is understood to be highly schematic in form, and serves only to provide a basis for understanding the prior art solution to the extended lock problem, as described next. It does not for instance show how the CPU communicates with system elements 5 through bus 3, nor is it intended to show how elements 5 can intercommunicate via bus 3; although these capabilities are generally available in many systems so configured today.

The extended lock problem mentioned earlier arises when the CPU accesses the memory subsystem in an atomic mode (Read Modify Write sequence, with —Lock asserted on line 13). Due to its internal cache, the CPU is potentially capable of keeping its lock signal active continuously while it carries out plural unrelated atomic accesses. This continuation of the lock signal must be prevented when it potentially conflicts with proper operation of the memory subsystem and/or the external elements 5. In the presently illustrated configuration, the CPU is unaware of external contention for memory access via bus 3, as represented by assertion of the Hold signal on control line 10. Accordingly, an external release logic circuit 15 has been provided in earlier systems for forcing the CPU to release its lock signal.

Circuit 15 essentially detects coincident assertions of signals —Rdy, +Hld, —Lk and +W (Write), and upon detecting such presents a "backoff" pulse signal (BOff) to CPU 4, via line 16. This signal forces the CPU to release (float) its lock signal. Since the backoff signal is asserted only when the CPU is performing a "locked write" operation relative to memory (the write portion of a read modify write operation, and only while there is coincident external contention for access to memory and/or bus 3 (+Hld asserted), assertion of the Backoff signal effectively prevents the CPU from concatenating atomic accesses under those conditions.

Line 16 connects to a backoff pin on the chip containing the CPU. When the input to that pin becomes active the CPU (particularly, an 80486 CPU) ks required to release (float) —Lk one internal (CPU) clock cycle later. Accordingly, circuit 15 times its activation of the BOff signal to occur within one CPU clock cycle of the completion of a current locked write operation. Other lines 20, connecting to CPU 4 are not used (are inactive) in this configuration. The timing of the signal at line 16 a allows the CPU to complete its current write operation to memory by the time —Lock is deasserted, but it does not allow the CPU to perform any other operations to memory before deassertion.

This is generally adequate, as a terminating procedure for a read modify write sequence, if (semaphore) data being atomically accessed is aligned on a memory address boundary, but it is inadequate and could lead to incomplete writing of the modified semaphore information if it is being written to an unaligned position in memory. This situation is described relative to FIG. 2.

Assume that atomic memory accesses are to word length semaphore operands. Then an aligned operand can be atomically read by the CPU from one word storage location, in one cycle of memory access, and a modified operand can be written to the same location in another cycle of memory access. However, if the operand is unaligned, then as shown at 30 (FIG. 2), the CPU requires two cycles of memory access to read the operand from two word storage locations, and two cycles of memory access to write such a modified operand to the same locations.

Figure 2:
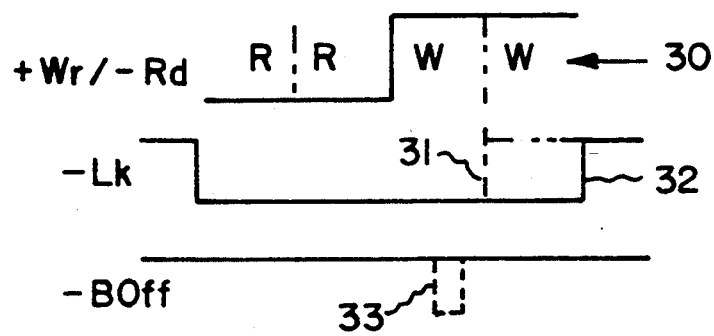
FIG. 2 is a diagram illustrating how the BOFF circuit of FIG. 1 could cause the CPU to terminate an atomic memory access operation prematurely, whereby integrity of data then being accessed by the CPU could potentially be compromised.

Possible states of the —Lk and —BOff signals during these unaligned accesses are indicated at 31–33 in FIG. 2. If —BOff is active during the first write operation, as suggested in dotted outline at 33 (and this is logically permitted by the circuit 15 as noted earlier), —Lk is released (floated) before the second write operation can be completed as indicated at 31, so that the modified semaphore word will have been incorrectly/incompletely written, and the integrity of the associated data or resource will have been potentially compromised.

2. Configuration With Present Solution

Figure 3:
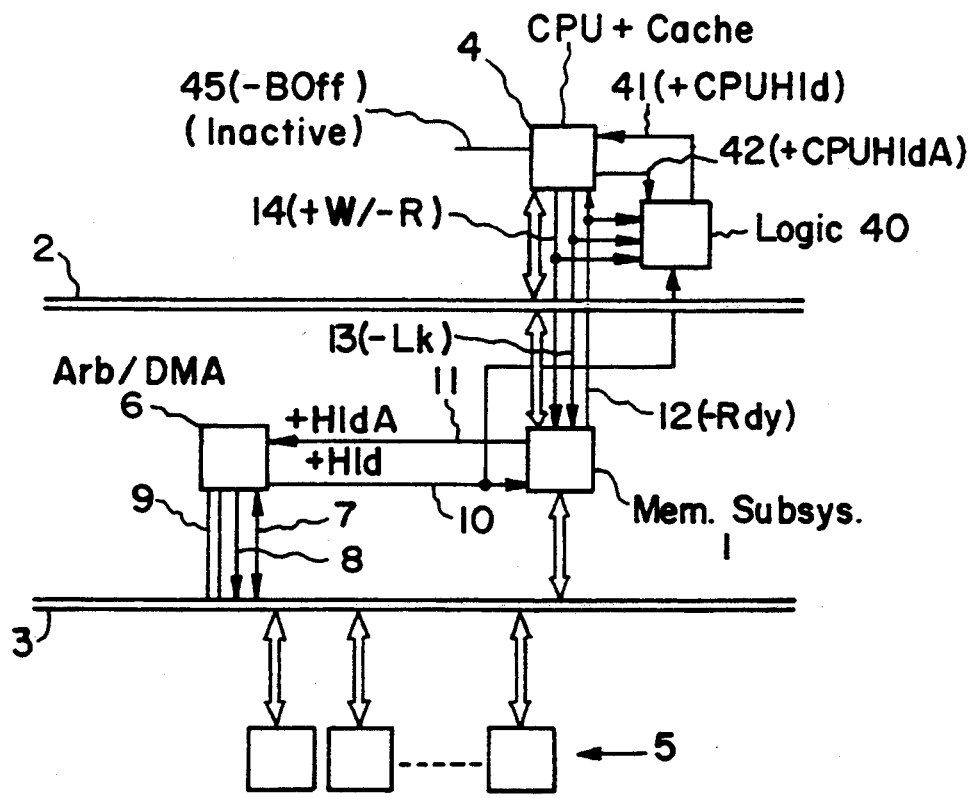
FIG. 3 is a block diagram showing how a circuit in accordance with the present invention is connected in the system configuration of FIG. 1, and showing HOLD REQUEST and HOLD ACKNOWLEDGE signal connections between that circuit and the CPU.

FIG. 3 shows the same system configuration as FIG. 1, with a new logic circuit mechanism 40 offering the present solution. Lines and system elements that are the same as in FIG. 1 retain the same identifying numbers.

Circuit 40 has the same inputs as circuit 15 in FIG. 1, but a different output 41 and a different internal logical structure which has a unique beneficial impact on CPU performance. Output 41 is a signal (+CPUHld) applied to the CPUHold CPU input (see lines 20, FIG. 1). When +CPUHld goes active, CPU 4 is required to release (float) −Lk, but only after (fully) completing its current atomic sequence. When the CPU floats −Lk, it activates a CPUHoldAcknowledge signal 42 (+CPUHldA) and effectively relinquishes control of the memory subsystem. As shown at 45, the BOff input of the CPU is tied inactive in this configuration.

Internally, circuit 40 is structured logically so that it activates CPUHold (see lines 20, FIG. 1) only when −Lk is active continuously for a CPU write operation followed by a CPU locked read operation, coincident with external contention (Hld active on line 10). The foregoing write operation, given the operating characteristics of the 80486 CPU, is expected to coincide with the end of a full read modify write atomic sequence, and the following read operation is associated with a second atomic sequence. These constraints are imposed in order to reduce potential interference with CPU access to the local and system buses.

When +CPUHld is activated, the CPU is effectively held off (prevented from accessing) bus 2 for three clock periods following completion of the last write operation of an atomic sequence. Accordingly, if +CPUHld was allowed to go active during a single unextended atomic sequence (an atomic sequence of read modify write operations, relative to one operand, that is not continuously concatenated with another atomic sequence), the CPU would be held off the bus for two internal CPU clock periods more than it would if +CPUHld remained inactive throughout that sequence.

Thus, by allowing activation of +CPUHld only during the second atomic access sequence of pair of continuously concatenated atomic sequences, an effective gain in CPU throughput is realized. Statistically, most atomic accesses are single unextended operations. Accordingly, the resulting gain in CPU performance could be significant.

Figure 4:
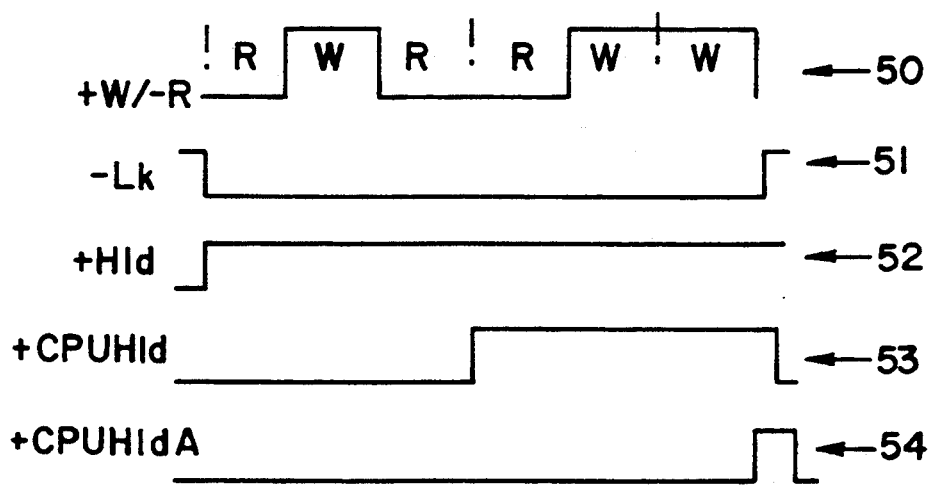
FIG. 4 is a diagram illustrating the time relation between HOLD signal actions initiated by a preferred embodiment of the circuit of FIG. 3 and memory access operations conducted by the CPU.

This operation is characterized in FIG. 4, which shows a pair of concatenated atomic access operations at 50. The first operation of this pair is directed to an aligned semaphore word, which is therefore handled in a single locked read operation followed by a single locked write operation. The second operation, directed to an unaligned semaphore operand, requires two consecutive read's (to read an operand from two word locations), followed by two writes (to write a modified operand to the same locations).

The −Lk signal, at 51, remains continuously active (negative) for the durations of the two atomic operations. The +Hld signal (indicating external contention), at 52, is also assumed to be active for the durations of both atomic operations. In this situation, +CPUHld, at 53, goes active between the two read operations of the second atomic operation, but does not immediately affect the state of −Lk; since +CPUHld requires the CPU to release −Lk only after completing the current atomic operation. Signal +CPUHldA, at 54, is driven active by the CPU when −Lk is released, and causes circuit 40 to deactivate +CPUHld. Thus, in each such linked pair of atomic cations, both operations are fully completed, regardless of operand alignment, so that the integrity of (unaligned) accessed operands is never potentially compromised (as it was in the operation of FIG. 2).

In a preferred embodiment, circuit 40 has been constructed in a programmed logic array (PAL) form defined by logical equations presented and explained below. The principal advantage of this form is that its logical design is more efficiently modifiable than discrete logic. However, discrete logic or other forms of logic would be suitable for the present circuit, and equivalent arrangements of discrete logic or other logical forms should be readily apparent to those skilled in the art from the following description of the PAL equations.

The PAL embodiment of logic circuit 40 is defined by the following expressions:

| (1) | Enable Lk_ | = CPUHld & !Testl; |
| --- | --- | --- |
| (2) | Lk_ | = LockedWr_; |
| (3) | !LockedWr_ | := CWR & Hld & !Rdy & !Lk |
| | | # !LockedWr_ & Hld & !Lk & !CPUHldA |
| | | # !LockedWr_ & Hld & Rdy_ & !CPUHldA; |
| (4) | CPUHld | := !LockedWr_ & Hld & !Rdy_ & !CWR & !Lk_ |
| | | # CPUHld & Hld & !LockedWr_ |
| | | # Testl; | where, LockedWr_ represents an internal state of the logic circuit, Lk_ is both an input and output state of the circuit, CWR is a CPU output corresponding to the signal +W/−R shown in the drawings, Testl is a testability input to the logic circuit (not shown in the drawings), # indicates a logic OR function, ! indicates a logic NOT function, & indicates a logic AND function, := indicates that the equation is for a clocked register in the PAL (note these symbols and equations are in a form accepted by the commercial PAL programming utility (ABEL) from Data I/O Corp., Redmond, Washington).

In the above equations, +CPUHld is an active high clocked output of circuit 40 that is used to request that the CPU (80486 or equivalent) go into a Hold state after the last locked cycle of its current atomic operation. The CPU will respond by floating the Lock signal while it is in the Hold state.

Signal LockedWr_ is an active clocked internally registered and fed back signal (in circuit 40), that is set when the end of a CPU locked write operation is detected in coincidence with an active +Hld signal (representing external contention for memory and/or bus 3). LockedWr_ stays active for as long as Hold remains active and the next CPU operation is locked and CPUHldA is inactive.

CPUHld is set active when the end of a CPU locked read operation coincides with both LockedWr_ and +Hld active (indicating that the CPU is performing a read portion of an atomic operation, that is the second operation in a pair of continuously concatenated atomic operations coinciding with external contention. CPUHld remains active until either LockedWr_ goes inactive in response to activation of CPUHldA or Hld goes inactive.

Another function performed by circuit 40 is to make sure that the Lock signal meets setup and hold timing requirements of the memory subsystem controller. This is done by having circuit 40 drive −Lk active and keep it active from a time prior to when the CPU relinquishes control (e.g. from the time when CPUHld goes active), and having circuit 40 drive −Lk inactive when the CPU has fully relinquished its control; so that the appearance and form of that signal at the memory interface is unaffected by its handling at the CPU. The memory subsystem can allow external access when the −Lk signal it receives is inactive.

The Test1 input is used primarily for placing the CPU in a Hold state for testing purposes.

We claim:

1. In a data processing system—which includes a central processing unit (CPU), a system bus, and a memory subsystem having separate connections to said CPU and said system bus, and in which said system bus serves to connect devices other than said CPU to said memory subsystem, and said CPU has a LOCK signal connection to the memory subsystem by which said CPU can activate a LOCK signal to secure exclusive and continuous access to the memory subsystem while the CPU is conducting one or more atomic access operations relative to said memory subsystem, each atomic access operation consisting of a sequence of read modify write operations that if interrupted could potentially compromise integrity of data then being accessed by said CPU—a logical circuit mechanism connected between said memory subsystem and said CPU for inducing the CPU to deactivate its LOCK signal only after fully completing an atomic access operation then being conducted relative to the memory subsystem, wherein:

said logical circuit mechanism is conditionally responsive to a LOCK signal from said CPU for presenting a CPU Hold signal (CPUHld) to said CPU, said CPUHld signal requiring said CPU to release (deactivate) said LOCK signal upon completion of a said atomic access operation instantly being conducted by said CPU.

2. A logical circuit mechanism in accordance with claim 1, wherein said CPU activates an acknowledgement signal CPUHldA in response to assertion of said CPUHld signal by said logical circuit mechanism, and said logical circuit mechanism is further responsive to activation of said CPUHldA signal to deactivate said CPUHld signal.

3. A logical circuit mechanism in accordance with claim 1, wherein:

said logical circuit mechanism detects when said devices other than said CPU require access to said memory subsystem, and wherein said mechanism activates said CPUHld signal only when said LOCK signal is active while said other devices require access to said memory subsystem.

4. A logical circuit mechanism in accordance with claim 1 wherein said mechanism detects an extended lock condition occurring only when said LOCK signal has been continuously active during the performance of more than one of said atomic access operations, and wherein said mechanism activates said CPUHld signal only upon detecting said extended lock condition.

5. A logical circuit mechanism in accordance with claim 4 wherein said mechanism detects when said devices other than said CPU require access to said memory subsystem, and wherein said mechanism activates said CPUHld signal only upon detecting said extended lock condition coinciding with said other devices requiring said access.

6. A logical circuit mechanism in accordance with claim 1 wherein said CPU releases said LOCK signal by relinquishing active control of a line conveying said LOCK signal and allowing said line to float transitionally, and wherein said mechanism maintains said line in an activated condition from a time prior to the time active control of said line is relinquished by the CPU, and drives said line to an inactive condition after the CPU has fully relinquished its control of said line.

7. A computer system comprising:

a memory subsystem;

a processing unit coupled to said memory subsystem and having locked control of said memory subsystem during performance of atomic access operations, each atomic access operation consisting of reading and writing data relative to two or more address locations in said memory subsystem; said processing unit asserting a LOCK signal when performing said atomic access operations and maintaining said LOCK signal continuously active while performing plural atomic access operations;

at least one device separate from said processing unit having access to said memory subsystem when said memory subsystem is not under said locked control of said processing unit via said LOCK signal; and logic circuit means coupled to said processing unit and said memory subsystem for asserting a Hold signal to said processing unit when said at least one device requires access to said memory subsystem;

said Hold signal causing said processing unit to release said LOCK signal but permitting said processing unit to complete an atomic access operation initiated prior to assertion of said Hold signal.

8. A computer system in accordance with claim 7 wherein:

said logic circuit means detects when said processing unit is performing more than one atomic access operation consecutively, without releasing said LOCK signal, and said logic circuit means activates said Hold signal only upon detecting that said processing unit is performing more than one atomic access operation.

* * * * *